US006697126B2

(12) United States Patent
Moni et al.

(10) Patent No.: US 6,697,126 B2
(45) Date of Patent: Feb. 24, 2004

(54) INTRA-FRAME VIDEO ERROR CONCEALMENT

(75) Inventors: Shankar Moni, San Jose, CA (US); John A. Tardif, San Jose, CA (US)

(73) Assignee: WebTV Networks, Inc., Mountain View, CA (US)

( * ) Notice: Subject to any disclaimer, the term of this patent is extended or adjusted under 35 U.S.C. 154(b) by 427 days.

(21) Appl. No.: 09/780,081

(22) Filed: Feb. 9, 2001

(65) Prior Publication Data

US 2002/0109787 A1 Aug. 15, 2002

(51) Int. Cl.[7] .................................................. H04N 5/21
(52) U.S. Cl. ....................................... 348/616; 382/275
(58) Field of Search ................................ 348/616, 466, 348/700, 607; 382/267, 268, 275; 386/47, 114, 116; 358/3.26

(56) References Cited

U.S. PATENT DOCUMENTS

| | | | | |
|---|---|---|---|---|
| 4,941,186 A | * | 7/1990 | Massmann et al. | ........... 382/54 |
| 5,621,467 A | * | 4/1997 | Chien et al. | ................ 348/409 |
| 5,892,853 A | * | 4/1999 | Hirani et al. | ............... 382/280 |
| 6,104,839 A | * | 8/2000 | Cok | ........................... 382/254 |

OTHER PUBLICATIONS

Le Buhan, C., *Software–Embedded Data Retrieval and Error Concealment Scheme for MPEG–2 Video Sequences*, Proceedings of the SPIE—The International Society for Optical Engineering, vol. 2668, p. 384–91, 1996.

Chien, M., et al., A Temporal and Spatial POCS Based Error *Concealment Algorithm for the MPEG Encoded Video Sequence*, Proceedings of the SPIE—The International Society for Optical Engineering, vol. 2501, pt. 1, p. 168–74, 1995.

Joo–Hee Kim, et al., An Image Data Compression Algorithm for a Home–*Use Digital VCR Using SBC With Block–Adaptive Quantization*, Journal of the Korean Institute of Telematics and Electronics, vol. 31B, No. 9, p. 124–32, Sep. 1994.

(List continued on next page.)

*Primary Examiner*—Victor R. Kostak
(74) *Attorney, Agent, or Firm*—Workman Nydegger

(57) ABSTRACT

Systems and methods for concealing video errors encountered in a frame of a static or moving image that can be used independently or in combination with conventional error concealment techniques, and can be used to conceal an error segment of any shape or location in a frame of a static or moving image. An error segment is identified. A first pixel set adjacent to the error segment and optionally one or more other pixel sets also adjacent to the error segment are selected corresponding the pixel set of the error segment and are flipped toward the error segment. The flipped pixel sets are then selectively weighted. Where only one pixel set is used, the flipped and weighted pixel set replaces the error segment to conceal the error segment. Where more than one pixel set is utilized, the pixel sets are added together to create a sum pixel set that replaces the pixels of the error segment to produce a smooth transition between the error segment and the adjacent, non-corrupt sets of pixels without any distracting boundaries. The smooth transition diminishes the visual impact of the error segment in the frame of the static or moving image.

34 Claims, 5 Drawing Sheets

OTHER PUBLICATIONS

Bahl, Paramvir, et al., *H.263 Based Video Codec for Real-Time Visual Communications Over Wireless Radio Networks*, Annual International Conference on Universal Personal Communications—Record vol. 2, 1997. IEEE, Piscataway, NJ, USA, 97th 8255, p. 773–779, 1997.

Park, Ju Yong, et al., *Simple Concealment for ATM Bursty Cell Loss*, Digest of Technical Papers—IEEE International Conference on Consumer Electronics 1993. Publ. by IEEE, IEEE Service Center, Piscataway, NJ, USA, p. 380–381, 1993.

Kauff, P., et al., *Codec for Digital Studio Recording of HDTV*, IEE Conference Publication No. 358, publ. by IEE, Michael Faraday House, Stevenage, Engl., p. 112–116, 1992.

E. Asbun and E. J. Delp, *Real–Time Error Concealment in Compressed Digital Video Streams*, Proceedings of the Picture coding Symposium 1999, Apr. 21–23, 1999, Portland, Oregon, pp. 345–348.

P. Salama, N. B. Shroff and E. J. Delp, *Error Concealment in Encoded Video Streams*, Signal Recovery Techniques for Image and video Compression and Transmission, edited by N.P. Galatsanos and A. K. Katsaggelos, Kluwer Academic Publishers, 1998, pp. 199–233.

S. Cen, P. Cosmos, F. Azadegan, *Decisions Trees for Error Concealment in Video Decoding*, Proceedings of the IEEE Data compression Conference (DCC), Snowbird, Utah, Mar. 29–31, pp. 384–393.

S. Cen. P. Cosman, *Comparison of Error Concealment Strategies for MPEG Video*, Proceedings of the IEEE Wireless Communications and Networking Conference (WCNC), New Orleans, Louisiana, Sep. 21–24, 1999, pp. 329–333.

\* cited by examiner

INTRA-FRAME VIDEO ERROR CONCEALMENT

BACKGROUND OF THE INVENTION

1. The Field of the Invention

The present invention relates to systems and methods for intra-frame video error concealment. More specifically, the present invention is directed to systems and methods for concealing a video error segment located in a frame of a static or moving image by utilizing an intra-frame concealment technique that selectively rotates, weights and adds pixels to diminish the visual impact of the error segment, thereby eliminating video discontinuities on which a viewer may focus.

2. The Prior State of the Art

With the development of electronic media such as television and computers, current technology allows static and/or moving images to be displayed on a display device. Generally, the images are represented by electronic video data that may be stored, duplicated, transmitted, manipulated, processed, compressed, and/or deleted. Scanners, cameras, recorders, drawing applications, and the like generate the video data corresponding to the displayed images.

A portion of the video data representing an image can become lost or corrupt, causing an error segment to appear in the displayed image. The error segment is a noticeable distraction for a viewer and can vary in its size and shape. Furthermore, the data loss can propagate and become even more rampant in moving images where future frames depend on the frame that contains the error segment. This error propagation causes the visual distraction to be even more noticeable to a viewer.

Current techniques used to remedy data loss and error propagation include utilizing data from another frame to conceal the error segment, employing an auto-regressive model to interpolate missing video data, and using a motion compensated error concealment technique. In utilizing data from another frame, the video data corresponding to the same location in the present frame where the error segment resides is taken from a previous frame and is used to replace the erroneous data. In the auto-regressive technique, a linear interpolation is required that is computationally expensive. In the motion compensated error concealment technique, motion vectors are utilized from previous or subsequent frames to replace the error segment and can become computationally complex. Each of the current concealment techniques allows discontinuity to exist in the static or moving image. The discontinuity is generally created at the boundaries of the error segment that is being concealed. Furthermore, the discontinuity in moving images can propagate to future dependent frames.

SUMMARY OF THE INVENTION

The present invention relates to systems and methods for intra-frame video error concealment. More specifically, the present invention is directed to systems and methods for concealing a video error segment located in a frame of a static or moving image by utilizing an intra-frame concealment technique that selectively rotates, weights and adds pixels to diminish the visual impact of the error segment, thereby eliminating video discontinuities on which a viewer may focus, including the discontinuities that are experienced in association with conventional error concealment techniques. The intra-frame concealment methods can be used independently or in combination with conventional error concealment techniques, and can be used to conceal an error segment of any shape or location in a frame of a static or moving image.

To conceal an error segment, implementation of the present invention includes flipping a first set of pixels immediately adjacent to the error segment so that the first set of pixels is overlaid on the error segment. The flipped first set of pixels is then selectively weighted. When a second set of pixels adjacent to the error segment is available, the second set is also flipped so that the second set of pixels is overlaid on the error segment. The flipped second set of pixels is also selectively weighted. The first and second sets are then added together to create a sum set of pixels that replaces the pixels of the error to diminish the visual impact of the error segment, thereby eliminating video discontinuities that a viewer may focus on due to the error segment present in the frame.

The error concealment methods of the present invention can be used for error segments of various shapes, sizes, and/or locations in a frame. The pixel sets that are flipped onto the error segment are selected to cover the error segment. The flipping of adjacent pixels, combined with the selective weighting of the flipped pixels, has the advantage of producing a smooth transition between the sum set of pixels and the adjacent first and second sets of pixels without any distracting boundaries. The smooth transition is created because the pixels from the sum set are adjacent and identical, or nearly identical, to non-corrupt, non-modified pixels. The smooth transitions and the sum set of pixels eliminate the video error discontinuities that have been traditionally experienced from video error segments and traditional error concealment techniques.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
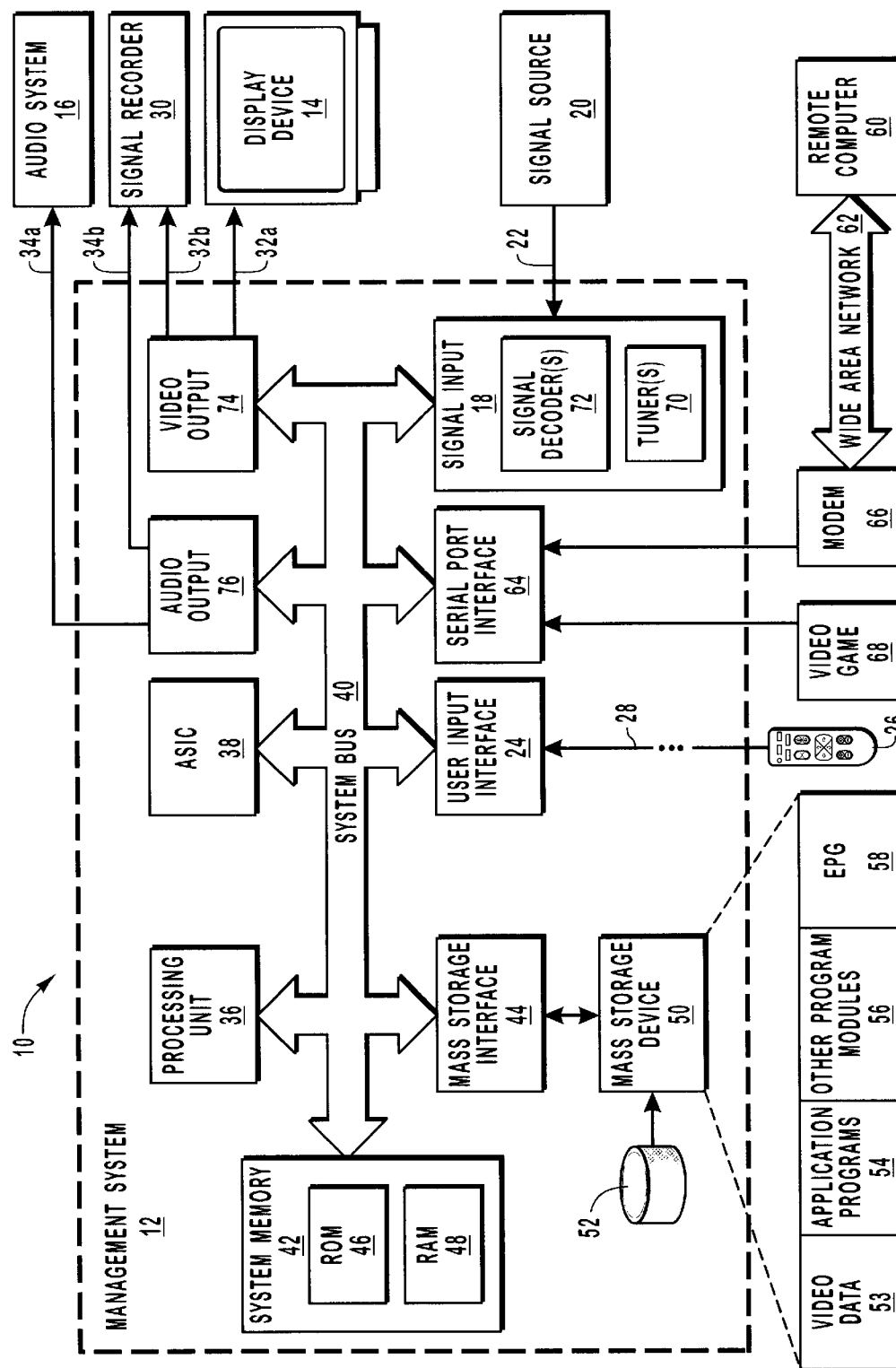
FIG. 1 illustrates an exemplary system that provides a suitable operating environment for the present invention.

The present invention extends to both systems and methods for intra-frame video error concealment. More specifically, the present invention is directed to systems and methods for concealing a video error segment located in a frame of a static or moving image by utilizing an intra-frame concealment technique that selectively rotates, weights and adds pixels to diminish the visual impact of the error segment, thereby eliminating video discontinuities on which a viewer may focus, including the discontinuities that are experienced in association with conventional error concealment techniques. The intra-frame concealment methods can be used independently or in combination with conventional error concealment techniques, and can be used to conceal an error segment of any shape or location in a frame of a static or moving image.

Embodiments of the present invention are associated with a video display system that displays a static or moving image and video error that causes an error segment to be present in the image. To conceal the error segment, pixels within the frame that are immediately adjacent to the error segment are flipped, selectively weighted, and may be added together to replace the pixels of the error segment. The selective flipping, weighting and adding of pixels diminishes the visual impact of the error segment and provides a smooth transition within the image, as will be further explained below.

The following disclosure of the present invention is grouped into two subheadings, namely "Exemplary Operating Environment" and "Intra-Frame Video Error Concealment." The disclosure relating to the first subheading provides an example of a suitable environment for implementation of the present invention, while the disclosure corresponding to the second subheading provides examples of implementing the present invention. The utilization of the subheadings is for convenience of the reader only and is not to be construed as limiting in any sense.

Exemplary Operating Environment

The embodiments of the present invention may comprise a special purpose or general purpose computer including various computer hardware. Set top boxes that enhance the capabilities of conventional televisions represent an example of a special purpose computer. A personal computer represents an example of a general purpose computer. The embodiments may further comprise multiple computers linked in a networked environment.

Embodiments of the present invention also include computer-readable media for carrying or having computer-executable instructions or data structures stored thereon. Such computer-readable media may be any available media that can be accessed by a general purpose or special purpose computer. By way of example, and not limitation, such computer-readable media may comprise physical storage media such as RAM, ROM, EEPROM, CD-ROM or other optical disk storage, magnetic disk storage or other magnetic storage devices, or any other medium that may be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above are also included within the scope of computer-readable media. Computer-executable instructions comprise, for example, instructions and data that cause a general purpose computer, special purpose computer, or special purpose processing device to perform a certain function or group of functions.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing steps disclosed herein. Furthermore, the term "home entertainment system" is to be understood as a term that broadly describes a video image viewing environment, whether it is located in a viewer's home, at a place of business, in the public, or at any other location.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying static and/or moving images.

FIG. 1 illustrates a home entertainment system 10 that includes a management system 12, a display device 14 and an audio system 16. Management system 14 may be a set-top box or Internet terminal that has been adapted to perform the operations disclosed herein. Management system 12 may be integrally positioned with or separate from display device 14, which may be a high definition television display, a standard television display, a flat panel display, a projection device, a high definition television display, a computer monitor, or any other device capable of displaying static and/or moving images. Audio system 16 may be a speaker, a stereo system, or any device capable of emitting sound data, and similarly may be integrally positioned with or separate from display device 14.

Management system 12 includes a signal input 18, which receives programming from a signal source 20. The programming is transmitted from signal source 20 to signal input 18 via a programming input line 22, which may be a cable or optic connection, a terrestrial antenna system, a satellite system, or any device or system capable of transmitting programming to home management system 12.

The signal source 20 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 10 as having a single programming input line 22 and a single signal source 20, those familiar with the art will appreciate that there can be a plurality of programming input lines that transmit programming from a plurality of signal sources. In such embodiments, the home entertainment system may receive the programming from one signal source or from a plurality of signal sources at a time.

Management system 12 also includes a user input interface 24, which receives input from an input device 26, such as a remote control, keyboard, microphone, or any other device capable of generating electronic instructions for management system 12. Input device 26 is communicatively coupled to management system 12 over an input link 28 so as to enable such control. Input device 26 generates electronic instructions over input link 28 in response to preprogrammed data or in response to a viewer pressing buttons on input device 26. Input device 26 may also control Web browser software within management system 12 as when management system 12 is a set-top box or an Internet terminal that has been adapted to perform the operations disclosed herein. For instance, input device 26 may be programmed to turn on home entertainment system 10 and to tune management system 12 to a channel.

FIG. 1 illustrates a signal recorder 30, which is capable of receiving video and/or audio data and recording the data on a storage medium. Video signals are transmitted to signal recorder 30 and/or to display device 14 by video image link 32, examples of which include a radio-frequency ("RF") link, an S-video link, a composite link, or any other equivalent form of video image link. Similarly, audio link 34 transmits audio data from management system 12 to audio system 16 or to signal recorder 30.

The operation of management system 12 is controlled by a central processing unit ("CPU"), illustrated as processing unit 36, which is coupled to an application-specific integrated circuit ("ASIC") 38 and uses computer-executable instructions implemented in software and/or hardwired logic circuitry. Processing unit 36 and ASIC 38 are coupled via a system bus 40, which also interconnects various other system components, such as the system memory 42, mass storage interface 44, user interface 24 and signal input 18. Processing unit 36 executes software designed to implement features of management system 12 including features of the present invention. ASIC 38 contains circuitry that is used to implement certain functions of management system 12. Instructions, data, and other software necessary for the operation of processing unit 36 and ASIC 38 may be stored in the system memory 42, such as in read-only memory ("ROM") 46, in random-access memory ("RAM") 48, and/or in a mass storage device 50, which is coupled to mass storage interface 44. ROM 46, RAM 48 and mass storage device 50 are communicatively coupled to ASIC 38 so as to be readable by ASIC 38 and so that data may be written from ASIC 38 to RAM 48 and possibly to mass storage device 50.

Mass storage device 50 may be a magnetic hard disk 52 or any other magnetic or optical mass memory device that is capable of storing large amounts of data. Any desired computer-readable instructions or data, including application programs 54, other program modules 56, and an electronic programming guide ("EPG") 58, which specifies the broadcast times and channels of programs can be stored in mass storage device 50. Mass storage device 50 may also be used to record video data 53, in which case, management system 12 functions as a digital video recorder.

EPG data may be obtained in a variety of manners. For instance, the EPG data can be supplied to management system 12 by a remote computer 60, such as a server, and stored on mass storage device 50. The EPG data is supplied on a regular basis to continually maintain a current schedule of programming at the management system 12. Where home entertainment system 12 is associated with the Internet, the data included in the EPG may be downloaded from the Internet. Alternatively, the EPG may delivered to the home entertainment system by using a direct-dial communication over standard telephone lines, or by using data transmission over the cable television infrastructure, a satellite network, an over-the-air broadcasting or any other available medium.

In the embodiment where management system 12 is associated with the Internet, management system 12 communicates with a remote computer 60 via a wide area network ("WAN") 62 by including a serial port interface 64 that is interposed between the system bus 40 and a modem 66, a wireless link, or other means for establishing communications over a WAN that may be internal or external to management system 12. Management device 12 is also capable of transmitting information via the Internet by direct-dial communication over standard telephone lines, or by using any other available communication medium.

While serial port interface 64 may be utilized to connect a modem 66 for communicating across a WAN, serial port interface may also be utilized to connect other consumer electronic devices, such as video game 68, and/or various input devices, such as a keyboard (not shown) or joystick (not shown), to management device 12.

Referring now to signal input 18, if the signal on programming input line 22 includes multiple channels, a tuner 70 included in signal input 18 tunes to a selected channel in the signal. Multiple tuners 70 can be used to provide enhanced viewing features, such as picture-in-picture, recording one channel while viewing another, and recording a plurality of channels simultaneously. A signal decoder 72 converts video data from an analog format to a digital format, or from a digital format to an analog format, in the event that ASIC 38 and tuner 70 employ different formats. Video decoder 72 also decodes video data from a compressed video format (e.g. MPEG). In embodiments where the management system 12 includes multiple tuners 70, management system 12 may also include multiple signal decoders 72 to perform the operations disclosed herein.

Management system 12 also includes a video output 74, which may include a video encoder and/or a video converter. The video encoder assigns a code to frames of video data that are transmitted across a video image link 32 and switches between analog and digital formats as necessary. Similarly, audio output 76 can include an audio converter to provide the necessary switching between analog and digital formats.

While FIG. 1 and the corresponding discussion above provide a general description of an example of a suitable environment in which the invention may be implemented, it will be appreciated that the features of the present invention disclosed herein may be practiced in association with a variety of different system configurations, such as in a networked computer system or in any other system capable of displaying video data corresponding to static and/or moving images.

Intra-Frame Video Error Concealment

As provided above, the present invention extends to both systems and methods for intra-frame video error concealment. Concealment of an error segment in a frame of a static or moving image in accordance with the present invention includes selecting pixels within the frame that are immediately adjacent to the error segment, flipping the selected pixels, weighting the flipped pixels, and optionally adding pixels to replace the pixels of the error segment with the sum set of pixels to diminish the visual impact of the error segment, as will be further explained below.

The following description is discussed in the general context of computer-executable instructions, such as program modules, being executed by set-top boxes or other computers. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 2:
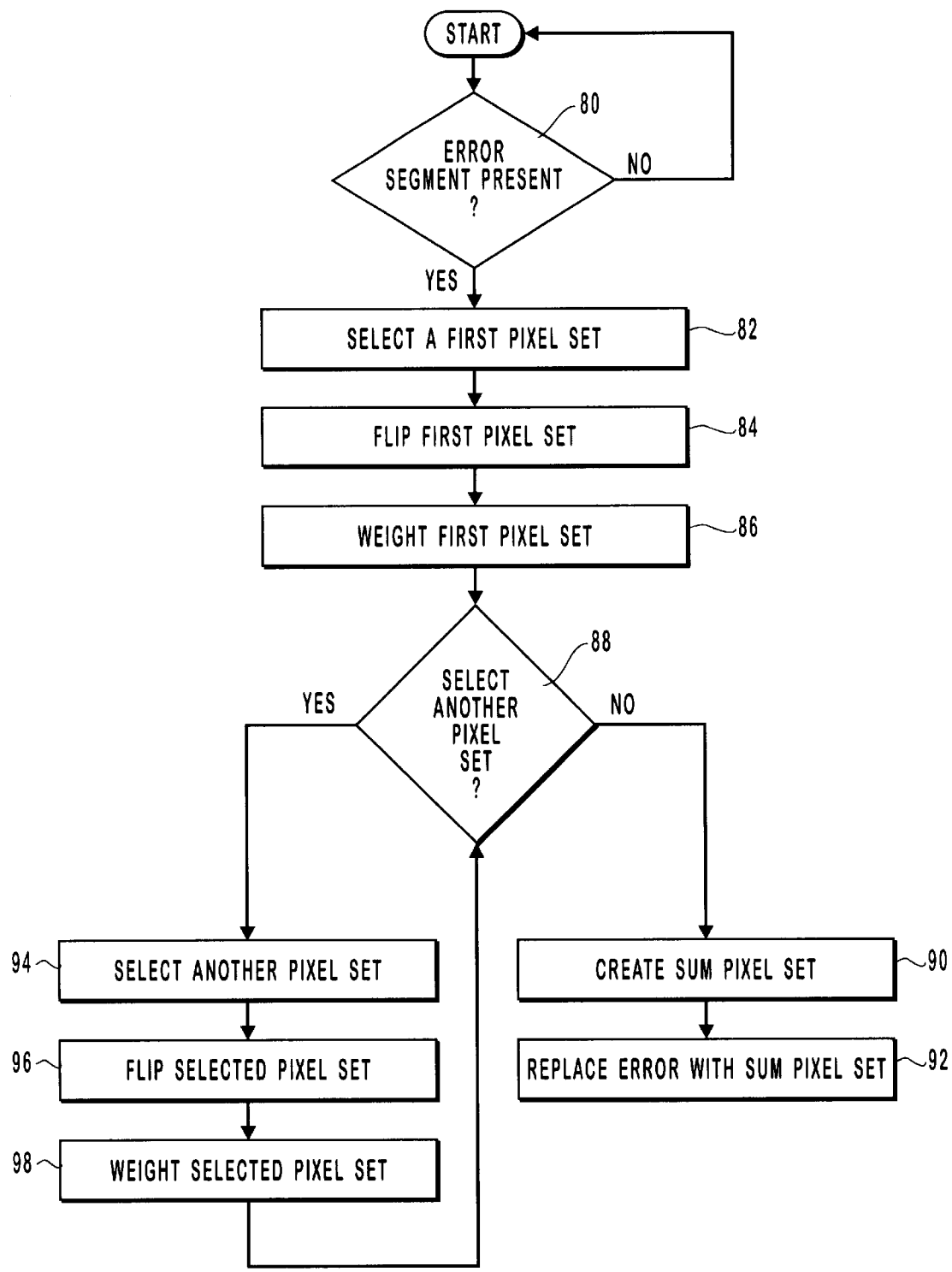
FIG. 2 is a flow chart illustrating an exemplary embodiment for concealing the visual impact of an error segment in a frame of a static or moving image.

With reference to FIG. 2, a flow chart is illustrated that provides an exemplary embodiment for concealing the visual impact of an error segment in a frame. The embodiment illustrated in FIG. 2 includes utilizing an intra-frame concealment technique that selectively rotates, weights and optionally adds pixels to diminish the visual impact of an error segment present in a frame. While FIG. 2 illustrates a method in which a plurality of pixel sets are first selected, flipped, weighted and added together to create a sum pixel set, equivalent methods can be performed by processing the pixel sets in any order, including processing the pixel sets in a substantially parallel manner.

Execution of the exemplary embodiment illustrated in FIG. 2 begins at decision block 80 for a determination as to whether or not an error segment is present in a frame of a static or moving image. Error can be introduced into the video data during transmission, storage, compression, etc. of the video data or by surrounding noise. By way of example, video error may be due to the occurrence of a packet loss when the video data was transmitted over a network. Alternatively, video data error can be introduced when an electrical device (e.g. a home appliance, a power tool, etc.) is used near the image-displaying system.

As an example, one technique that may be used for determining the presence of an error segment includes a signal decoder, such as signal decoder 72 of FIG. 1, receiving start codes that do not conform to the established protocol. Therefore, in accordance with the embodiment illustrated in FIG. 2, if no error is present in the video data, execution returns back to start. Alternatively, if an error segment is present in the video data, execution proceeds to step 82.

At step 82, a first pixel set adjacent to the error segment is selected to correspond to the pixel set of the error segment. The selected pixel set is flipped toward the error segment at step 84 and is selectively weighted at step 86. The weighting of the flipped pixel set is selectively applied to allow for a smooth transition from non-erroneous pixels to pixels corresponding to the error segment. Generally, the weighting is the greatest at the boundary between a non-erroneous pixel and a pixel corresponding to the error segment. Then, the weighting is gradually reduced in proportion to the distance of the flipped pixels from the boundary of the non-erroneous pixels, as will be further explained below. Alternatively, when only one pixel set is selected the weighting is uniformly applied to all flipped pixels.

Once a weighting has been applied to the flipped pixels, execution proceeds to decision block 88 for a determination as to whether or not to select another pixel set. When another pixel set cannot be selected, such as when the error segment spans an entire edge of the frame, execution proceeds to step 90 for the creation of the sum pixel set. Where only one pixel set is selected, the sum pixel set is the first flipped and weighted pixel set, as will be further explained below. At step 92, the error segment is replaced with the sum pixel set.

Returning back to decision block 88, if another pixel set is to be selected, execution proceeds to step 94 for the selection of another pixel set that is adjacent to the error segment in the frame. The pixel set selected at step 94 corresponds to the pixel set of the error segment, is flipped towards the error segment at step 96 and is selectively weighted at step 98. The weighting is generally applied so that the weighting is the greatest at the boundary between a non-erroneous pixel and a pixel corresponding to the error segment, and is reduced in proportion to the distance of the flipped pixels from the boundary of the non-erroneous pixels, as will be further explained below.

Once the weighting has been applied at step 98, execution returns to decision block 88 for a determination as to whether or not another pixel set is to be selected. If another pixel set is to be selected, execution returns through steps 94, 96 and 98 to select, flip and weight a third pixel set, and then execution returns back to decision block 88. This process continues until all pixel sets have been selected, flipped and weighted. Once all of the pixel sets have been selected, flipped and weighted, execution proceeds to step 90 for the creation of a sum pixel set. Where more than one pixel set was selected, each of the selected, flipped and weighted pixel sets are added together to create a sum pixel set at step 90. Execution then proceeds to step 92, where the error segment is replaced with the sum pixel set.

Figure 3:
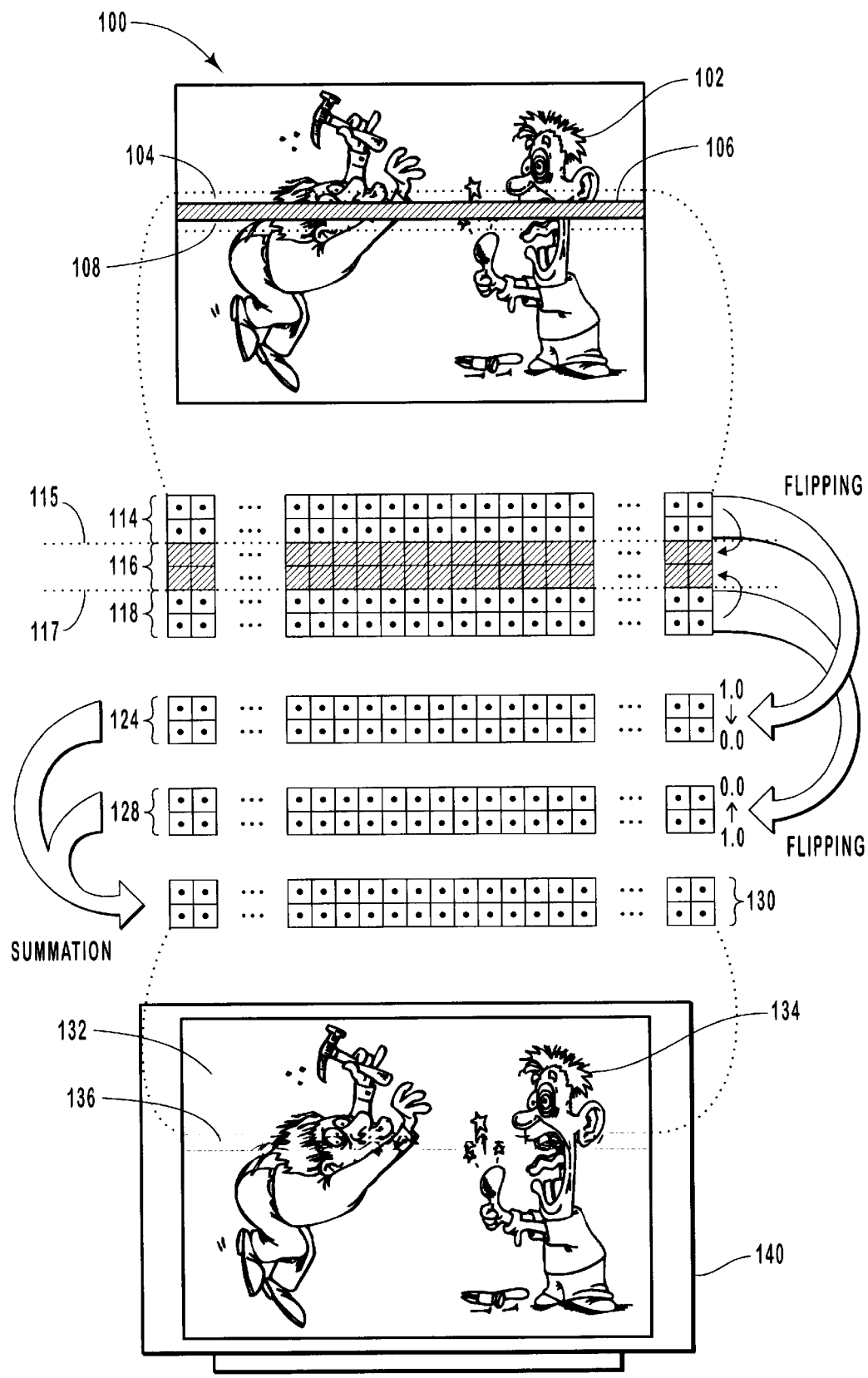
FIG. 3 illustrates an exemplary manner for implementing the method of FIG. 4.

To further understand the embodiment illustrated in FIG. 2, an example is provided in FIG. 3 for utilizing the intra-frame concealment embodiment of FIG. 2. In FIG. 3, a video frame, illustrated as video frame 100, provides an example of a video frame of a static or moving image 102 that includes an error segment 106. While error segment 106 is a rectangular segment that spans the width of video frame 100, the error segment can be any number of pixels high (i.e. pixel height=n pixels rows), any number of pixels long (i.e. pixel length=m pixel columns) and any shape (i.e. a polygon, a circle, etc.). Therefore, in accordance with the embodiment illustrated in FIG. 2, once decision block 80 identifies error segment 106 present in frame 100, the identification of which includes the determination of the set of pixels included in error segment 106, execution proceeds to step 82.

At step 82, a first pixel set 104 of FIG. 3 is selected from the affected frame 100 that corresponds to the pixel set of error segment 106. First selected pixel set 104 and error segment 106 are more specifically detailed as first pixel set 114 and error segment 116 to illustrate individual pixel blocks. To simplify the illustration of FIG. 3, each square region of first pixel set 114 and error segment 116 represents a block of 8×8 pixels, assuming that error segment 116 has a height of eight pixels. However, embodiments in accordance with the present invention embrace error pixel sets having various different shapes and/or sizes, as will be further explained below. Therefore, as illustrated, first selected pixel set 114 matches the pixel height and length of error segment 116. Execution then proceeds to steps 84 and 86 of FIG. 2.

At steps 84 and 86 of FIG. 2, selected first pixel set 114 is respectively flipped toward error segment 116 and is selectively weighted. With reference to FIG. 3, the flipping is illustrated by flipping selected first pixel set 114 about axis 115, which is positioned at the junction of the error pixel set 116 and selected first pixel set 114. The weighting is selectively applied with decreasing weights starting with 1.0 at the top of the flipped pixel set and running to 0.0 at the bottom of the flipped pixel set. The resultant pixel set is illustrated in FIG. 3 as flipped and weighted first pixel set 124.

Execution proceeds to decision block 88 of FIG. 2 for a determination as to whether or not to select another pixel set. In FIG. 3, another pixel set within frame 100 that is adjacent to error segment 106 is available and is illustrated as pixel set 108. Therefore, at step 94, pixel set 108 is selected to correspond to the pixel set of error segment 106. Selected pixel set 108 is more specifically detailed as second pixel set 118 to illustrate individual pixel blocks, where each square region of second pixel set 118 represents a block of 8×8 pixels, assuming that error segment 116 has a height of eight pixels. Execution then proceeds to steps 96 and 98 of FIG. 2.

In FIG. 2, a copy of the pixel set selected at step 94 is flipped toward the error segment at step 96 and is selectively weighted at step 98. With reference to FIG. 3, the flipping is illustrated by flipping selected second pixel set 118 about axis 117, which is positioned at the junction of the error pixel set 116 and the selected second pixel set 118. The weighting is selectively applied with increasing weights starting at 0.0 at the top of the flipped second pixel set and running to 1.0 at the bottom of the flipped second pixel set. The resultant pixel set is illustrated in FIG. 3 as flipped and weighted second pixel set 128.

As no other pixel sets within frame 100 are available that are adjacent to error segment 106, execution proceeds to step 90 of FIG. 2 to create a sum pixel set. With reference to FIG. 3, the flipped and weighted first pixel set 124 is added to the flipped and weighted second pixel set 128 to create a sum pixel set 130. As illustrated, the resultant sum pixel set 130 matches the pixel height and length of the error pixel set 116, which corresponds to error 106. Execution then proceeds to step 92 of FIG. 2.

At step 92 the error segment located in the frame is replaced with the sum pixel set to create a modified video frame. With reference to FIG. 3, error 106 of frame 100 is replaced by sum pixel set 130 to create a modified video frame 132 that is displayed on a display device 140. This is illustrated in FIG. 3 by modified video frame 132, which includes a modified image 134 having a modified portion 136 that corresponds to the sum pixel set 130 created to replace error segment 106. As such, while the modified image 134 is not identical to the state of the video frame had no video error occurred, the visual impact of the modified portion 136 of video frame 132 is diminished from the visual impact of the error segment 106 of the originally affected video frame 100.

Furthermore, it has been found that a primary distracting quality of an error in video data is the discontinuity in the image that is perceived by the human eye, rather than the blurring, smudging, or other loss of image accuracy, particularly with displayed moving images. The methods of the present invention substantially eliminate this discontinuity, while exhibiting some loss of image accuracy, which is an inevitable consequence of experiencing an error in the video data.

Therefore, the rotation of selected pixel sets 114 and 118 about axes 115 and 117, respectively, combined with the application of differential weighting, results in an error pixel set 116 being replaced with a sum pixel set 130 in a manner that substantially eliminates the discontinuities at edges of the error segment that have been experienced in associated with conventional error concealment methods. In particular, assigning a weight of 1.0 to the top row of the flipped first pixel set 124 results in the pixel row of sum pixel set 130 having image data that is substantially identical to the bottom row of selected pixel set 114. Ensuring that these two sets of pixels have substantially identical image data results in the perceived image at the junction between the top of modified portion 136 of video frame 132 and the immediately adjacent non-corrupted portion of video frame 132 being continuous and smooth. Also, assigning a weight of 1.0 to the bottom row of the flipped second pixel set 128 produces a similarly smooth and continuous image that is perceived at the junction between the bottom of modified portion 136 of video frame 132 and the immediately adjacent portion of video frame 132. Producing the perception of a substantially smooth and continuous transition between the error-concealed portion of the image and the adjacent non-corrupted portion of the image in a frame that includes an error, as produced by the present invention, has not been possible using conventional techniques.

While the intra-frame video error concealment methods of the present invention were applied in FIG. 3 to a rectangular error segment that spanned the width of the frame, the embodiments of the present invention embrace concealing error segments of various shapes, sizes and/or locations in a frame of a static or moving image. FIGS. 4–8 and the accompanying disclosure below provide examples of providing intra-frame video error concealment in accordance with the present invention to a variety of different error segment shapes, sizes and/or locations by utilizing a copy of one or more pixel sets from the video frame that are adjacent to the error segment of the frame. As will be illustrated below, the copy of the one or more error segments utilized in accordance with the present invention may be above, below, to the right of, to the left of, or in any location adjacent to the error segment of the video frame. Furthermore, the flipping of the copy of the one or more error segments may be about a horizontal axis, a vertical axis, a linear axis on an angle, or a non-linear axis.

Figure 4:
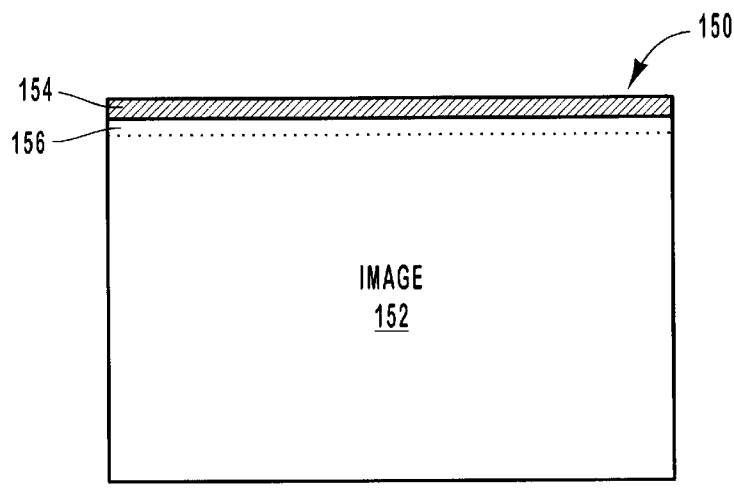
FIG. 4 illustrates an example of selecting only one set of pixels to conceal an error segment in a frame.

In FIG. 4, a frame 150 of a static or moving image 152 is illustrated as having an error segment 154. Since the error segment is at an edge of frame 150, only one pixel set of frame 150 is available for selection. Therefore, in accordance with the present invention, a copy of pixel set 156 is selected to correspond to error segment 154. The selected pixel set 156 is flipped toward error segment 154 and selectively weighted. Since only one pixel set is available for selection, the selective weighting applied to the flipped error segment is a uniform weighting to provide a smooth transition between the flipped and weighted pixel set and the adjacent set of pixels without any distracting boundaries.

The flipped and weighted set of pixels is the sum set of pixels that is used to replace the pixels corresponding to the error segment 154. As such a smooth transition is created because the pixels from the sum set are adjacent and identical, or nearly identical, to non-corrupt, non-modified pixels. The smooth transitions and the sum set of pixels eliminate the video error discontinuities that have been traditionally experienced from video error segments and traditional error concealment techniques.

Figure 5:
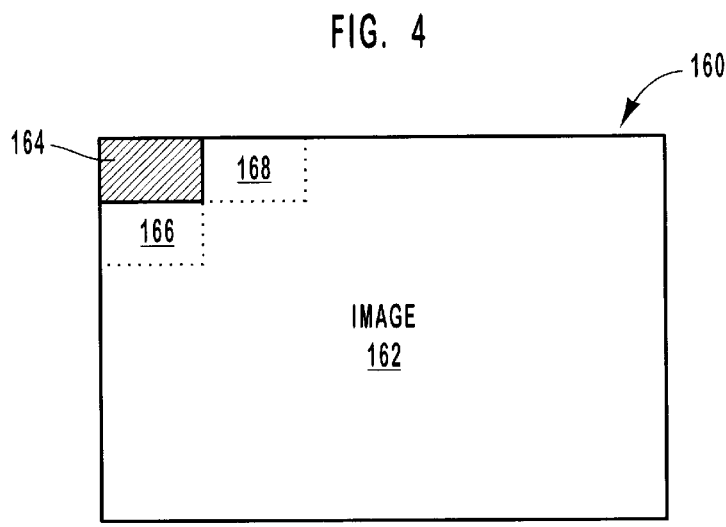
FIG. 5 illustrates an error segment located at one of the corners of a frame.
Figure 6:
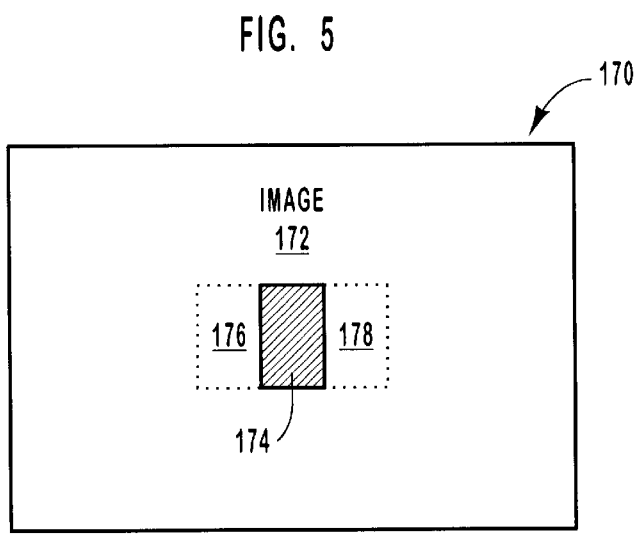
FIG. 6 illustrates an example of horizontal concealment

In FIG. 5, a frame 160 of a static or moving image 162 is illustrated as having an error segment 164 in one of the corners of frame 160. Furthermore, error segment 164 does not span the width or height of the frame. In a first embodiment, a copy of pixel set 166 is selected to correspond to error segment 164. The selected pixel set 166 is flipped toward error segment 164 and selectively weighted with a uniform weighting to provide a smooth transition between the flipped and weighted pixel set and the adjacent set of pixels without any distracting boundaries. The flipped and weighted set of pixels is the sum set of pixels that is used to replace the pixels corresponding to the error segment 164.

In another embodiment, a copy of pixel set 168 is selected to correspond to error segment 164. The selected pixel set 168 is flipped toward error segment 164 and selectively weighted with a uniform weighting to provide a smooth transition between the flipped and weighted pixel set and the adjacent set of pixels without any distracting boundaries. The flipped and weighted set of pixels is the sum set of pixels that is used to replace the pixels corresponding to the error segment 164.

In yet another embodiment, a copy of pixel sets 166 and 168 are each independently selected to correspond to error segment 164, flipped toward error segment 164 and selectively weighted. The weighting of each of the flipped copies of pixel sets 166 and 168 starts at 1.0 at the border where the non-corrupted pixels abut pixels that have been selected, flipped and weighted, and decreases to 0.0. The flipped and weighted copies of pixel sets 166 and 168 are then added to create a sum set of pixels that replaces error segment 164 in frame 160 to produce the perception of a substantially smooth and continuous transition between the error-concealed portion of the image and the adjacent non-corrupted portion of the image in a frame that includes an error.

As illustrated in FIG. 3, the present invention embraces a selection of a top pixel set and a bottom pixel set in relation to an error segment of a frame. Embodiments of the present invention also embrace a selection of a first and second pixel sets that are adjacent to the error segment so as to cause the first and second pixel sets to be flipped horizontally. Therefore, in FIG. 6, a frame 170 of a static or moving image 172 is illustrated as having an error segment 174. A copy of pixel sets 176 and 178 are independently selected and horizontally flipped toward error segment 174. The flipped pixel sets are each selectively weighted, where the weighting of each of the flipped copies of pixel sets 176 and 178 starts at 1.0 at the borders where the corresponding non-corrupted pixels abut pixels that have been selected, flipped and weighted, and decreases to 0.0. The flipped and weighted copies of pixel sets 176 and 178 are then added to create a sum set of pixels that replaces error segment 174 in frame 170 to produce a smooth transition between the sum set of pixels and the non-corrupt pixels of the frame.

Figure 7:
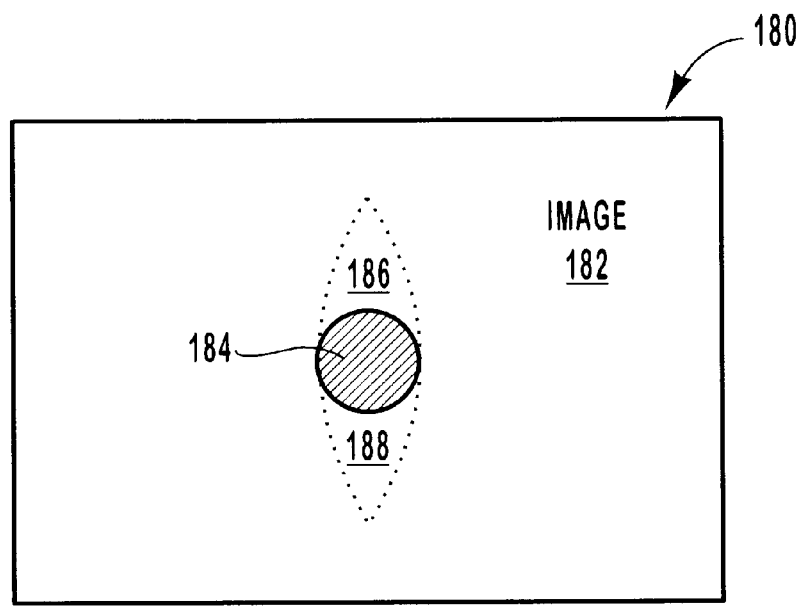
FIG. 7 illustrates vertical concealment for a non-rectangular error segment.

In FIG. 7, a frame 180 of a static or moving image 182 is illustrated as having a non-rectangular error segment 184. Therefore, to conceal the error segment 184 in accordance with the present invention, a copy of pixel set 186 and a copy of pixel set 188 are selected to correspond to error segment 184. The selected copies of pixel sets 186 and 188 are each flipped toward the error segment 184 and selectively weighted. The weighting of each of the flipped copies of pixel sets 176 and 178 starts at 1.0 at the borders where the corresponding non-corrupted pixels abut pixels that have been selected, flipped and weighted, and decreases to 0.0. The flipped and weighted copies of pixel sets 186 and 188 are then added to create a sum set of pixels that replaces error segment 174 in frame 170 to produce a smooth transition between the sum set of pixels and the non-corrupt pixels of the frame.

Figure 8:
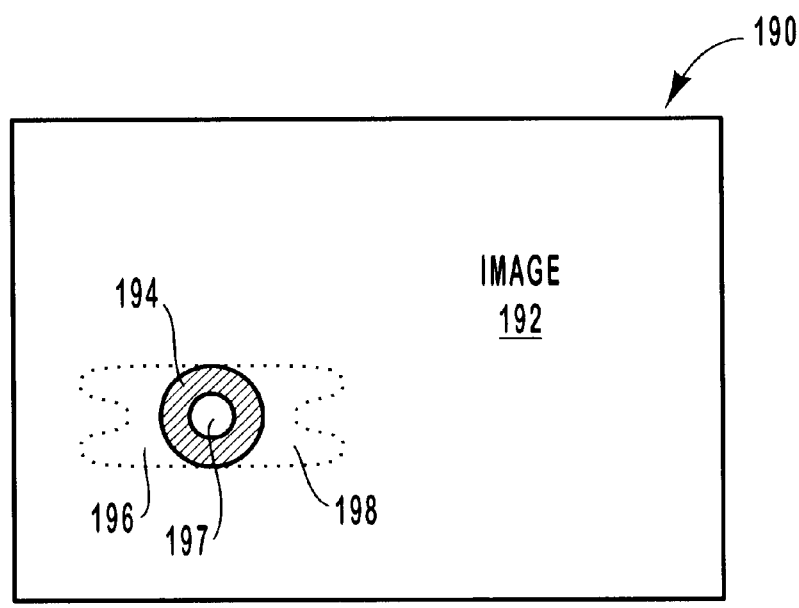
FIG. 8 illustrates horizontal concealment for a non-rectangular error segment.

In FIG. 8, a frame 190 of a static or moving image 192 is illustrated as having a non-rectangular error segment 194 about a non-corrupt pixel set 197. Therefore, to conceal the error segment 194, a copy of pixel set 196 and a copy of pixel set 198 are selected to correspond to error segment 194. The selected copies of pixel sets 196 and 198 are each flipped toward the error segment 194 and selectively weighted. Furthermore a first copy of pixel set 197 is selected, flipped toward pixel set 196 and selectively weighted, and a second copy of pixel set 197 is selected, flipped toward pixel set 198 and selectively weighted. The weighting of each of the four flipped copies of pixel sets starts at 1.0 at the borders about which they were flipped where the corresponding non-corrupted pixels abut pixels that have been selected, flipped and weighted, and decreases to 0.0. In another embodiment, the weighting does not necessarily decrease after starting at 1.0 at the borders. For example, in the case of textured surfaces, a weighting that includes a best linear projection with boundary constraints could result in negative and/or non-monotonic coefficients. The flipped and weighted copies of all four pixel sets are then added to create a sum set of pixels that replaces error segment 194 in frame 190 to produce a smooth transition between the sum set of pixels and the non-corrupt pixels of the frame. The smooth transition is created because the pixels from the sum set are adjacent and identical, or nearly identical, to non-corrupt, non-modified pixels. The smooth transitions and the sum set of pixels eliminate the video error discontinuities that have been traditionally experienced from video error segments and traditional error concealment techniques.

Therefore, as provided above, the present invention relates to systems and methods for intra-frame video error concealment. More specifically, the present invention is directed to systems and methods for concealing a video error segment located in a frame of a static or moving image by utilizing an intra-frame concealment technique that selectively rotates, weights and adds pixels to diminish the visual impact of the error segment, thereby eliminating video discontinuities on which a viewer may focus, including the discontinuities that are experienced in association with conventional error concealment techniques. The intra-frame concealment methods can be used independently or in combination with conventional error concealment techniques, and can be used to conceal an error segment of any shape or location in a frame of a static or moving image.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes a monitor for displaying a static or moving image, a method for concealing an error segment present in a frame of the image, the method comprising the acts of:

encountering error data corresponding to the error segment in the frame, the error segment comprising a set of corrupt pixels; and selectively replacing the error segment with a set of modified pixels, wherein said set of modified pixels is obtained by performing the acts of:

flipping a copy of a first pixel set toward the error segment; and selectively applying a first weighing to said copy of said first pixel set.

2. A method as recited in claim 1, wherein said set of modified pixels is obtained by further performing the acts of:

flipping a copy of a second pixel set of the frame toward the error segment;

selectively applying a second weighing to said copy of said second pixel set; and adding said weighted and flipped copy of said first pixel set to said weighted and flipped copy of said second pixel set.

3. A method as recited in claim 2, wherein said first pixel set is adjacent to the error segment in the frame.

4. method as recited in claim 3, wherein said second pixel set is adjacent to the error segment in the frame.

5. A method as recited in claim 4, wherein said first weighting is 1.0 at a first border about which said first pixel set was flipped and decreases therefrom.

6. A method as recited in claim 5, wherein said second weighting is 1.0 at a second border about which said second pixel set was flipped and decreases therefrom.

7. A method as recited in claim 6, wherein one or more of said modified pixels located at said first border includes image data that is substantially identical to image data included in one or more adjacent pixels of said first pixel set.

8. A method as recited in claim 7, wherein one or more of said modified pixels located at said second border includes image data that is substantially identical to image data included in one or more adjacent pixels of said second pixel set.

9. A method as recited in claim 1, wherein said first weighting is applied uniformly to said first pixel set.

10. A method as recited in claim 9, wherein said first weighting applied to each pixel of said first pixel set is 1.0.

11. A method as recited in claim 1, wherein a video decoder encounters said error data as video data is decoded.

12. A video error concealment system for reducing the visual impact of an error segment in a video frame of a static or moving image, the system comprising:

video data that includes error data corresponding to the error segment in the video frame;

a processor for:

flipping a first copy of one or more pixels from the video frame towards the error segment;

applying a first weighting to said flipped first copy of the one or more pixels to create a modified pixel set; and replacing the error segment with said modified pixel set; and a monitor coupled to said processor for displaying the video frame, including said modified pixel set.

13. A video error concealment system as recited in claim 12, wherein said first weighting applied by said processor is uniformly applied to all of said first copy of one or more pixels.

14. A video error concealment system as recited in claim 12, wherein said processor modifies said a second copy of one or more pixels from the video frame by flipping said second copy towards the error segment and applying a second weighting to said flipped second copy.

15. A video error concealment system as recited in claim 14, wherein said first weighting applied by said processor is 1.0 at a first border about which said first copy of one or more pixels was flipped by said processor and decreases therefrom.

16. A video error concealment system as recited in claim 15, wherein said second weighting applied by said processor is 1.0 at a second border about which said second copy of one or more pixels was flipped by said processor and decreases therefrom.

17. A video error concealment system as recited in claim 16, wherein said processor adds said weighted and flipped first copy to said weighted and flipped second copy to create said modified pixel set.

18. A video error concealment system as recited in claim 17 wherein the one or more pixels for said first and second copies of one or more pixels are adjacent to the error segment in the video frame.

19. A video error concealment system as recited in claim 18, further comprising:

a means for obtaining a signal that includes said video data, wherein said means for obtaining a signal is coupled to said processor; and a signal decoder coupled to said means for obtaining a signal, wherein said signal decoder decodes said video data.

20. A video error concealment system as recited in claim 19, wherein said signal decoder encounters said error data.

21. A computer program product for implementing within a computer system a method for concealing an error segment located within a frame of an image, the computer program product comprising:

a computer readable medium for providing computer program code means utilized to implement the method, wherein the computer program code means is comprised of executable code for implementing the acts of:

encountering corrupt video data that corresponds to the error segment; and selectively replacing the error segment with a set of modified pixels, wherein said set of modified pixels is obtained by performing the acts of:

flipping a first copy of a first pixel set of the frame toward the error segment; and applying a first weighing to said first copy of said first pixel set.

22. A computer program product as recited in claim 21, wherein said first pixel set is adjacent to the error segment in the frame.

23. A computer program product as recited in claim 22, wherein said first weighting is applied uniformly to said first pixel set.

24. A computer program product as recited in clam 21, wherein said set of modified pixels is further obtained by performing the acts of:

flipping a second copy of a second pixel set of the frame toward the error segment;

applying a second weighing to said second copy of said second pixel set; and adding said weighted and flipped first copy to said weighted and flipped second copy.

25. A computer program product as recited in claim 24, wherein said first and second pixel sets are adjacent to the error segment in the frame.

26. A computer program product as recited in claim 25, wherein said first weighting is 1.0 at a first border about which said first pixel set was flipped and decreases therefrom.

27. A computer program product as recited in claim 26, wherein said second weighting is 1.0 at a second border about which said second pixel set was flipped and decreases therefrom.

28. A computer program product as recited in claim 27, wherein one or more of said modified pixels located at said first border includes image data that is substantially identical to image data included in one or more adjacent pixels of said first pixel set.

29. A computer program product as recited in claim 28, wherein one or more of said modified pixels located at said second border includes image data that is substantially identical to image data included in one or more adjacent pixels of said second pixel set.

30. In a system that includes a display device for displaying video data, a method for concealing an error present within a frame of the video data, the method comprising the acts of:

encountering error data corresponding to an error segment in the frame, said error segment including corrupt video data having a height of n pixel rows and a length of m pixel columns;

selectively replacing said error segment with a set of modified pixels, wherein said set modified pixels is obtained by performing the acts of:

flipping a copy of a first pixel set of the frame, wherein said first pixel set has a height of said n pixel rows and a length of said m pixel columns;

applying a first weighing to said copy of said first pixel set;

flipping a copy of a second pixel set of the frame, wherein said second pixel set has a height of said n pixel rows and a length of said m pixel columns;

applying a second weighing to said copy of said second pixel set; and adding said weighted and flipped copy of said first pixel set and said weighted and flipped copy of said second pixel set to produce said set of modified pixels.

31. A method as recited in claim 30, wherein said first pixel set is located immediately above said error segment, and wherein said copy of said first set of pixels is flipped about a first horizontal axis located at a top of said error segment.

32. A method as recited in claim 31, wherein said second pixel set is located immediately below said error segment, and wherein said copy of said second set of pixels is flipped about a second horizontal axis located at a bottom of said error segment.

33. A method as recited in claim 32, wherein said first weighting decreases from top to bottom of said copy of said first pixel set, and wherein said second weighting increases from top to bottom of said copy of said second pixel set.

34. A method as recited in claim 33, wherein said m is equal to the number of columns in the frame, such that the error segment extends across the width of the frame.

* * * * *